United States Patent
Suzuki

(10) Patent No.: US 6,913,831 B2
(45) Date of Patent: Jul. 5, 2005

(54) COATING MATERIAL FOR RECYCLING AND A THERMOPLASTIC RESIN MOLD

(75) Inventor: Yasuhiro Suzuki, Mie (JP)

(73) Assignees: Suzuka Fuji Xerox, Co., Ltd., Mie (JP); part interest; Tohpe Corporation, Osaka (JP); part interest ( * ) Notice: Subject to any disclaimer, the term of this patent is extended or adjusted under 35 U.S.C. 154(b) by 96 days.

(21) Appl. No.: 10/664,529

(22) Filed: Sep. 16, 2003

(65) Prior Publication Data

US 2004/0126607 A1 Jul. 1, 2004

(30) Foreign Application Priority Data

Dec. 26, 2002 (JP) ........................................ 2002-378759

(51) Int. Cl.⁷ ................................................ B32B 27/00
(52) U.S. Cl. ................ 428/425.1; 428/452; 428/479.3; 428/481; 428/496; 428/507; 428/532
(58) Field of Search ............................ 428/425.1, 452, 428/479.3, 481, 496, 507, 532

(56) References Cited

U.S. PATENT DOCUMENTS

| | | | |
|---|---|---|---|
| 6,610,758 B2 * | 8/2003 | Suzuki | 521/40.5 |
| 6,664,303 B1 * | 12/2003 | Michael et al. | 521/41 |
| 6,703,445 B2 * | 3/2004 | Suzuki | 525/64 |
| 6,794,419 B2 * | 9/2004 | Suzuki | 521/45.5 |

* cited by examiner

*Primary Examiner*—Ieszek B Kiliman
(74) *Attorney, Agent, or Firm*—Donald S. Dowden; Cooper & Dunham LLP

(57) ABSTRACT

The object of the present invention is to provide a coating material for recycling a thermoplastic resin mold, wherein said coating material is coated on the surface of said thermoplastic resin mold and said thermoplastic resin mold, discarded, can be recycled without removing the coating film of said coating material.

To attain said object, a thermoplastic resin mold is coated with a coating material containing a thermoplastic resin and non-yellowing type cellulose derivative as vehicles, said thermoplastic resin having compatibility with the thermoplastic resin of said thermoplastic resin mold. Said thermoplastic resin mold, surface coated, used, and discarded, can be recycled without removing the coating film of said coating material, and further the resulting recycled thermoplastic resin mold does not degrade.

17 Claims, 1 Drawing Sheet

Surface          Back

COATING MATERIAL FOR RECYCLING AND A THERMOPLASTIC RESIN MOLD

BACKGROUND OF THE INVENTION

1 Field of the Invention

The present invention relates to a coating material for recycling and a thermoplastic resin mold on the surface of which said coating material is applied or printed wherein said thermoplastic resin mold is recycled without removing the coating film of said coating material formed on the surface of said thermoplastic resin.

2 Prior Art

There are cases where the surface of a thermoplastic resin mold is coated with a coating material such as paint, ink, and the like. In a case where thermoplastic resin as a vehicle of said coating material has no compatibility with thermoplastic resin composing said thermoplastic resin mold, if said thermoplastic resin mold is recycled without removing the coating film of said coating material, said thermoplastic resin of said coating material may separate from said thermoplastic resin of said resin mold during crushing, melting and molding processes, resulting in degradation of mechanical strength of a mold made of recycled thermoplastic resin (recycled resin mold).

Further, nitrocellulose or low molecular polyvinylchloride may be added to said vehicle of said coating material to improve coating workability, dispersibility of pigment, drying property, and the like, but since said additives have poor heat stability, when said resin mold is recycled without removing said coating film of said coating material, yellowing of said additives may take place during crushing melting and molding processes, and color of the resultant recycled resin mold is degraded.

A PROBLEM TO BE SOLVED BY THE INVENTION

In a case where the thermoplastic resin mold on which paint or ink is applied is to be recycled, it is necessary to remove the coating film of said paint or ink.

Said coating film should be removed with a solvent or by grinding. Such work is time consuming and labor intensive, and shows the recycling process.

MEANS TO SOLVE SAID PROBLEM

To solve said problem, the present invention provides a coating material for recycling containing a thermoplastic resin having compatibility with a thermoplastic resin of a thermoplastic resin mold on which said coating material is applied and a non-yellowing type cellulose derivative as vehicles wherein said thermoplastic resin mold on which said coating material is applied can be recycled without removing coating film of said coating material.

In said coating material for recycling, said non-yellowing cellulose derivative is such as methyl cellulose ethyl cellulose, hydroxy cellulose, hydroxy propyl methyl cellulose, hydroxy ethyl methyl cellulose, cellulose acetate, acetyl cellulose, benzyl cellulose, cellulose, cellulose acetate butyrate and cellulose acetate propionate and the like, and it is desirable that the viscosity of said cellulose acetate butyrate is in the range of 0.1 sec to 0.55 sec.

Moreover, it is desirable that acetyl group content of said cellulose acetate butyrate is in the range of 0 to 15.0% by weight.

Further, it is desirable that butyryl group content of said cellulose acetate butyrate is in the range between 30.0 and 55.0% by weight.

Furthermore, it is desirable that propionyl group content of said cellulose acetate propionate is in the range of 40 to 50% by weight and hydroxyl group content is in the range of 1 to 5% by weight.

Still further, it is desirable that said cellulose acetate is cellulose diacetate and acetylation degree is in the range of 50 to 60% by weight.

In addition, it is desirable that said ethoxy group content of said ethyl cellulose is in the range of 45 to 50% by weight and methoxy group content of said methyl cellulose is in the range of 19 to 31.5% by weight.

Additionally, it is desirable that hydroxy propyl group content of said hydroxy propyl methyl cellulose is in the range of 4 to 12% by weight and hydroxy ethoxy group content of said hydroxy ethyl methyl cellulose is in the range of 4 to 12%.

Said coating material is such as paint and ink.

The present invention provides a thermoplastic resin mold on the surface of which any of said coating materials is applied.

Attachment(s) made of a thermoplastic resin having compatibility with a thermoplastic resin composing said thermoplastic resin mold may be attached to said thermoplastic resin mold by an adhesive or welding rod, said adhesive or welding rod being made of a thermoplastic resin having compatibility with said thermoplastic resin composing said thermoplastic resin mold.

Further, a rubber like material having compatibility with a thermoplastic resin composing said thermoplastic resin mold may be added to said thermoplastic resin as a recycle aid agent.

A rubber like material having compatibility with each thermoplastic resin composing both said thermoplastic resin mold and said attachment may be added to each thermoplastic resin as a recycle aid agent.

Action

In a case where said thermoplastic resin mold is coated with said coating material containing said thermoplastic resin having compatibility with said thermoplastic resin composing said thermoplastic resin mold as vehicle, said thermoplastic resin mold, after being discarded, can be reused as molding material by crushing, and if desired by palletizing, without removing coating film of said coating material.

Further, since said coating material contains non-yellowing cellulose derivative, yellowing of said thermoplastic resin of said resin mold does not take place not to damage color of the resulting recycled resin mold.

Embodiment

The invention is described below in details.

[Thermoplastic Resin]

In the present invention, any kind of thermoplastic resin generally used as material of resin mold can be used.

Said thermoplastic resin is such as polystyrene resins polymerized with polystyrene monomers, such as polystyrene (PS), high impact polystyrene (HIPS) and the like, styrene resins including nitrile monomers and styrene monomers, such as acrylonitrile-styrene copolymer (AS) and the like, styrene resins including nitrile monomers, styrene monomers and butadiene monomers, such as acrylonitrile-styrene-butadiene copolymer (ABS) and the like, polyolefin resins such as polyethylene (PE), polypropylene (PP) and the like, engineering plastics such as polyphenylene ether (PPE), polycarbonate (PC), polyamide (PA), polysulfone (PSF), polyetherimide (PEI), poly methyl methacrylate (PMMA) and the like, polyester resins such as polyethylene terephthalate (PET), polybutylene terephthalate (PBT), vinyl type resin such as polyvinyl chloride (PVC) and the like, and a mixture thereof including two kinds and over of said thermoplastic resins mentioned above.

Especially the present invention may be usefully applied for polystyrene type resin, copolymer of nitrile type monomer and styrene type monomer, PPE, and ABS, AAS (ASA), AES, high impact polystyrene (HIPS), modified PPE, PP containing ABS and/or HIPS, mixture or polymer blend or polymer alloy containing ABS and/or HIPS and PC, PA, PBT, PSF, PEI and the like.

Some thermoplastic resins are explained in details below.

A. Styrenic Resin

Styrenic resin for the present invention is a resin containing at least 25% by weight of styrenic monomer in polymer and said styrenic resin includes such as homo polymer of styrene type monomer, copolymer of two or more kinds of said styrene type monomer, copolymer of one or more kind(s) of said styrene type monomer and one or more kind(s) of monomer which can copolymerize with said styrene type monomer, graft copolymer in which one or more kind(s) of said styrene type monomer is (are) graft-copolymerized to said diene type rubber, microblend or polymer blend of said styrene type resin and said diene type rubber, and the like.

Typical styrenic resin is such as polystyrene homopolymer (PS), high impact polystyrene (HIPS), which is a blend polymer including polystyrene and rubbery polymer which is that styrene monomer is grafted into said diene rubbers, acrylonitrile-styrene copolymer (AS), styrene-butadiene copolymer, styrene-α-methyl styrene copolymer, styrene-maleic anhydride copolymer, styrene-methylmethacrylate copolymer, styrene-ethylene copolymer, styrene-ethylene-propylene-butadiene copolymer, ABS resin, which is a blend polymer including acrylonitrile-styrene copolymer and graft copolymer which is that acrylonitrile monomer and styrene monomer are grafted into butadiene rubber, ACS resin, which is a mixture resin including chlorinated polyethylene and acrylonitrile-styrene copolymer, AES resin, which is a mixture resin including acrylonitrile-styrene copolymer and terpolymer which is that acrylonitrile monomer and styrene monomer are grafted into olefin rubbers, AAS resin, which is a mixture resin including acrylonitrile-styrene copolymer and terpolymer which is that acrylonitrile monomer and styrene monomer are grafted into acrylic rubbers, ASiS resin, which is a mixture resin including acrylonitrile-dimethylsiloxane-styrene copolymer and acrylonitrile-butadiene-styrene copolymer resin, a mixture resin consisting of styrene copolymer having olefin rubber grafted with styrene, and styrene polymer, a mixture resin consisting of styrene copolymer having acrylic rubber grafted with styrene, and styrene polymer, and the like.

B. Poly Phenylene Ether (PPE) Resin

Typical PPE resin for the present invention is such as 2,6-dimethyl-1,4-phenylene ether prepared by oxidative polymerization of 2,6-xylenol by using copper catalyst and further include copolymer of 2,6-dimethyl-1,4 phenylene ether and 2,3,6,-trimethyl-1,4-phenylene ether, copolymer of 2,6-dimethyl phenol and 2, 3, 6,-trimethyl phenol, and the like.

Further, PPE resin denatured by styrenic resin and/or polyamide resin is also used in the present invention.

C. Polycarbonate (PC) Resin

In the resent invention, PC resin may be singly used as a thermoplastic resin for molding, but usually PC resin is blended in said styrenic resin or PPE resin to prepare a polymer alloy or a polymer blend.

Any kind of PC resin which is polycarbonic ester derivated from aromatic dihydroxy compound is used in the present invention.

Said aromatic dihydroxy compound is such as 2,2-bis(4-hydroxyphenyl)propane (i.e. bisphenol A), tetramethyl-bisphenol A, tetrabromobisphenol A, bis(4-hydroxyphenyl)-p-diisopropylbenzene, hydroquinone, resorcinol, 4,4'-dihydroxydiphenyl and the like and generally bis(4-hydroxyphenyl)alkane type dihydroxy compound is selected and especially bisphenol A or the combination of bisphenol A and other aromatic dihydroxy compound is preferably selected.

D. Polyolefinic Resin

Polyolefinic resin used in the present invention is produced by polymerization of one or more kind of α-olefin using radical initiator, metal oxide catalyst, Ziegler-Natta catalyst, Kaminsky catalyst, and the like and two or more polyolefinic resins may be mixed together.

Said α-olefin is normal chain or branched-chain or cyclic chain olefin having polymerizable double bond at α-position and usually α-olefin having 2 to 8 carbons is selected. Said α-olefin is such as ethylene and propylene. Said polyolefin resin used in the present invention may include copolymer of α-olefin and the other monomer(s) which can copolymerize with α-olefin. Said other monomers may include such as á â unsaturated organic acid such as acrylic acid, methacrylic acid, maleic acid, itaconic acid, methyl acrylate, ethyl acrylate, methyl methacrylate, maleic anhydride, arylmaleimide, alkylmaleimide and the like, the derivatives thereof, vinyl ester such as vinyl acetate, vinyl butyrate and the like, aromatic vinyl compound such as styrene, methyl styrene and the like, and vinyl silane such as vinyl trimethoxysilane, a methacryloyloxipropyltrimethoxysilane and the like and the like and further a little amount of non conjugated diene such as 1,4 hexadiene, 4-methyl-1, 4hezadiene, 5-4-methyl-1,4-hexadiene, dicyclopentadiene, ethylidene norborner (4-ethlidene-2-norborner) and the like may be copolymerized.

Typical polyolefinic resin is such as polyethylene, polypropylene, ethylene-vinylacetate copolymer, ethylene-acrylic acid copolymer and the like.

Said polyolefinic resin is used singly or two or more kinds of said polyolefinic resins may be mixed together as molding material, and further, thermoplastic resin such as PS, HIPS, AS, ABS resin, PPE resin and the like may be mixed in said polyolefinic resin.

E. Polymer Blend, Polymer Alloy

Typical thermoplastic resins used in the thermoplastic resin used in the present invention are described above, and two or more kinds of said thermoplastic resins may be mixed together to be polymer blend or polymer alloy in the present invention. Said polymer blend or polymer alloy is prepared by mixing with a screw of an extruder and the like.

To improve impact strength of said thermoplastic resin for molding above mentioned diene rubbers, olefin rubbers, acrylic rubbers, such as NR, BR, SBR, STR, IR, CR, CBR, IBR, IBBR, HR, acrylic rubber, polysulfide rubber, urethane rubber, polyether rubber, epichlorohydrin rubber, chlorobutyl rubber, hydrogenated nitorile rubber, fluorinated rubbers and the like, vinyl resins such as ethylene/vinyl acetate copolymer, acrylic resin, ethylene/ethyl acrylate copolymer, vinyl chloride and the like, other thermoplastic resin such as polynorbornene and the like may be mixed in said molding thermoplastic resin material.

Further, to improve impact strength of said thermoplastic resin, thermoplastic elastomer (TPE) may be added to said thermoplastic resin. Said thermoplastic elastomer shows vulcanized rubber properties at room temperature while said thermoplastic elastomer can be molded by heating, and said thermoplastic elastomer consists of hard segment and soft segment. Said TPE may include such as urethane elastomer, styrenic elastomer, vinyl elastomer, ester elastomer and the like.

[Resin Mold]

Said resin mold of the present invention is manufactured by various kinds of molding methods such as injection-molding, blow-molding, vacuum forming, air pressure forming, press molding, extrusion molding and the like by using said thermoplastic resin as molding material and the resulting mold may have various shapes such as vessel shape, box shape, tray shape, sheet shape and the like.

[Attachment]

Said attachment attached to said resin mold of the present invention is manufactured by the same method as used in the molding of said resin mold, using a thermoplastic resin having compatibility with a thermoplastic resin composing said resin mold.

Said attachment includes such as a handle, leg, seal, label, frame and the like and said attachment is attached to said resin mold.

Thermoplastic resin having compatibility with a thermoplastic resin composing said resin mold is a thermoplastic resin which can be melted by heating and mixed in said thermoplastic resin of said resin mold without phase separation. The same thermoplastic resin as used in said resin mold is used as the material of said attachment.

For instance, in the case where thermoplastic resin of said resin mold is HIPS or PS; HIPS, PS or the like which have compatibility with said thermoplastic resin of said resin mold is used as the material of said attachment.

In the case where thermoplastic resin of said resin mold is ABS or AS; ABS, AS, AES, AAS, ACS, ASiS or the like which have compatibility with said thermoplastic resin of said resin mold is used as the material of said attachment.

In the case where thermoplastic resin of said resin mold is PPE or modified PPE; PPE, modified PPE, PS, HIPS or the like which have compatibility with said thermoplastic resin of said resin mold is used as the material of said attachment.

In the case where thermoplastic resin of said resin mold is a mixture of PC and ABS (including polymer alloy or polymer blend); a mixture of PC and ABS, AS, AES, AAS, ACS, ASiS or the like which have compatibility with said thermoplastic resin of said resin mold is used as the material of said attachment.

[Coating Material]

Said coating material used in the present invention is such as paint, ink and the like which are applied on the surface of said resin mold and said coating material contains a thermoplastic resin having compatibility with the thermoplastic resin of said resin mold as a vehicle. Said thermoplastic resin as a vehicle is a thermoplastic resin which can be melted by heating and mixed without phase separation.

For instance, styrenic resin, styrene modified acrylic resin and the like are used as vehicles for said resin mold consisting of styrenic resin, PPE resin or PC resin.

A cellulose derivative is added to said thermoplastic resin as a vehicle to improve coating workability, pigment dispersibility, drying property and the like and non-yellowing type cellulose derivative is selected in the present invention.

Said non-yellowing type cellulose derivative may includes methyl cellulose, ethyl cellulose, hydroxy cellulose, hydroxy propyl methyl cellulose, hydroxy ethyl methyl cellulose, cellulose acetate, acetyl cellulose, benzyl cellulose, cellulose, cellulose acetate butyrate, cellulose acetate propionate and the like.

The viscosity of said cellulose acetate butyrate is preferably in the range of 0.1 to 0.55 sec. Said cellulose acetate butyrate having a viscosity between 0.1 and 0.55 sec. has a most excellent solubility for solvent, and said coating material containing said cellulose acetate butyrate is easily prepared and has a most excellent coating workability, and pigment dispersibility in said coating material is also satisfactory.

The content of said cellulose acetate butyrate is preferably between 0 and 15.0% by weight.

The more the acetyl group content of said cellulose acetate butyrate is increased, the higher the grease resistance, tensile strength, hardness, melting point and specific gravity of said coating film from said coating material containing said cellulose acetate butyrate advantageously become.

On the other hand, in the case where the acetyl group content is beyond 15.0%, usually, required properties of said coating film are impaired. Accordingly, the acetyl group content of said cellulose acetate butyrate is preferably in the range of 0 to 15%.

Butyryl group content of said cellulose acetate butyrate is preferably in the range of 30.0 to 55.0%.

Said cellulose acetate butyrate containing butyryl group in said range has a good solubility for solvent, compatibility, and diluting property, and the coating film of said coating material containing said cellulose acetate butyrate has a good flexibility, water resistance and so on.

Said cellulose acetate propionate desirably contains propionyl group in the range of 40 to 50% by weight and further desirably contains hydroxyl group in the range of 1 to 5% by weight. In the case where hydroxyl group content is beyond 5% by weight, the resulting coating film becomes tacky.

Said cellulose acetate is preferably cellulose diacetate and acetylation degree of said cellulose diacetate is preferably in the range of 50 to 60% by weight, more preferably 54 to 56% by weight.

Said cellulose diacetate whose acetylation degree is in the range of 50 to 60% by weight has the best solubility for solvent such as ester type solvent, ketone type solvent, halogenated hydrocarbon type solvent and the like, and said cellulose diacetate is the most suitable for preparation of the coating material and coating workability, and further said cellulose diacetate also has a good pigment dispersibility.

Still further, in the case where acetylation degree of said cellulose diacetate is beyond 60% by weight, properties of the coating film of said coating material containing said cellulose diacetate becomes not sufficient for a practical coating film and in the case where acetylation degree of said cellulose diacetate is less than 50% by weight, said cellulose diacetate has a poor solubility for solvents.

Ethoxy group content of said ethyl cellulose is preferably in the range of 45 to 50% by weight. In the case where ethoxy group content of said ethyl cellulose is in the range of 45 to 50% by weight, said ethyl cellulose has the best compatibility with the resin used in said coating material for paint or printing ink.

Said coating material may be clear lacquer, but in the case where said coating material is used for coloring, pigments such as titan white, iron oxide red, cobalt blue, carbon black, and the like and dyestuff such as diaperse dye, cationic dye, basic dye, acid dye, metal complex salt dye, reactive dye, direct dye, sulphur dye, vat dye, ice dye, complex dye and the like is added to said coating material.

Further, plasticizer such as dimethyl phthalate, dibutylphthalate, dioctyl phthalate and the like, antioxidant, ultraviolet absorber, dispersant for pigment or dyestuff, and the like may be added to said coating material.

As vehicle of said coating material for said resin mold made of styrenic resin, PPE resin, and PC resin, styrene modified acrylic resin is preferably used.

Said styrene modified acrylic resin is a copolymer of styrene and acrylic ester. As said acrylic ester, such as acrylate such as methylacrylate, ethylacrylate, n-propyl acrylate, iso-propyl acrylate, n-butyl acrylate, iso-butyl acrylate, t-butyl acrylate, 2-ethyl hexyl acrylate, cyclohexyl acrylate, tetrahydrofurfuryl acrylate and the like; methacrylate such as methyl methacrylate, ethyl methacrylate, n-propyl methacrylate, iso-propyl methacrylate, n-butyl methacrylate, iso-butyl methacrylate, 2-ethyl hexyl methacrylate, cyclohexylmethacrylate, tetrahydrofurfuryl methacrylate, stearyl methacrylate, lauryl methacrylate and the like can be used.

In said styrene modified acrylic resin, other vinyl monomer(s) such as vinyl ether such as methyl vinyl ether, ethyl vinyl ether, n-propyl vinyl ether, n-butyl vinyl ether, iso-butyl vinyl ether and the like; nitrile type monomer such as acrylonitrile, methacrylonitrile and the like; aliphatic vinyl compound such as vinyl acetate, vinyl propionate and the like, olefin such as ethylene, propylene and the like; diene such as isoprene, chloroprene, butadiene and the like; α, β-unsaturated carbonate such as acrylic acid, methacrylic acid, itaconic acid, maleic acid, crotonic acid, atropic acid, citraconic acid and the like; monomer having hydroxyl group such as 2-hydroxy ethyl methacrylate, 2-hydroxy ethyl acrylate, 2-hydroxy propyl methacrylate, 2-hydroxy propyl acrylate, allyl alcohol and the like; amide such as acryl amide, methacryl amide, diacetone acrylamide and the like; monomer having amino group such as dimethyl amino methyl methacrylate, dimethyl amino ethyl methacrylate, dimethyl amino propyl acrylate; monomer having epoxy group such as glycidyl acrylate, glycidyl methacrylate, glycidyl allyl ether; monomer having hydrolysis silyl group g-methacryloxy propyl tri methoxy silane; vinyl acetoxy silane, p-trimethoxy silyl styrene, p-triethoxy silyl styrene, p-trimethoxy silyl-α-methyl styrene, p-triethoxy silyl-α-methyl styrene, γ-acryloxy propyl trimethoxy silane, vinyl tri methoxy silane, N-β-(N-vinyl benzyl amino ethyl-γ-amino propyl)trimethoxy silane hydrochloride and the like, may be copolymerized so far as said styrene modified acrylic resin ford not impair the compatibility with thermoplastic resin of said resin mold. Said vinyl monomer may be singly copolymerized or two or more said vinyl monomers may be copolymerized.

Said coating material made of said styrene modified acrylic resin can be used for any resin mold made of said styrenic resin such as HIPS, PS, ABS, AS and the like, PPE, modified PPE, mixture of PC and ABS and the like and said coating material has a good adhesiveness, weather resistance, and workability so that said coating material is very useful as paint and the like.

Said coating material is applied on the surface of said resin mold or said attachment by any well known coating method and generally air-spray coating is used.

Said coating material made of thermoplastic resin having compatibility with the thermoplastic resin of said resin mold, said resin mold on whose surface said coating material is applied can be recycled without removing the coating film from said resin mold. Accordingly, said resin mold on whose surface said coating material of the present invention is applied a resin mold having an excellent recycle ability.

Said adhesive used in the present invention is used to bond said attachment to said resin mold.

[Adhesive]

Adhesive of the present invention is prepared by dissolving a thermoplastic resin in a organic solvent to be a resin solution of the organic solvent, said thermoplastic resin having compatibility with the thermoplastic resin of said resin mold and said attachment, and said thermoplastic resin being as a vehicle of said coating materials applied on the surface of said resin mold and said attachment.

Said thermoplastic resin having compatibility with thermoplastic resins of said resin mold etc. is a thermoplastic resin wherein said thermoplastic resin is melted by heating and mixed with the thermoplastic resin of said resin mold etc. without phase separation.

Further, thermoplastic resin used in said adhesive is the same thermoplastic resin as used as the material of said resin mold and said attachment, and number average molecular weight of said thermoplastic resin used in said adhesive is less than 100,000, desirably less than 50,000, more desirably less than 20,000. Said adhesive using said thermoplastic resin whose number average molecular weight is in said range has a low viscosity, accordingly a good coating workability since said adhesive does cause stringiness during coating.

Said organic solvent is selected so that said organic solvent dissolve the thermoplastic resins of said resin mold and said attachment as well as the thermoplastic resin of said adhesive.

Said organic solvent is such as ketone type organic solvents such as acetone, methyl ethyl ketone, methyl isobutyl ketone, cyclohexanone and the like, aromatic organic solvents such as toluene, xylene and the like, liner or cyclic hydrocarbon type such as n-hexane, cyclohexane and the like, cellosolve type solvents such as cellosolve acetate, methyl cellosolve, ethyl cellosolve, n-butyl cellosolve and the like, ester type solvents such as ethyl acetate, n-butyl acetate, amyl acetate and the like, alcoholic solvents such as methanol, ethanol, n-propanol, iso-propanol, n-butanol, iso-butanol, t-butanol, cylohexanol and the like. Said organic solvent is used singly or mixture of two or more organic solvents is also used.

[Welding Rod]

A welding rod of the present invention is used to bond said resin mold to said attachment. Adhesive of the present invention is prepared by dissolving a thermoplastic resin in an organic solvent to be a resin solution of the organic solvent, said thermoplastic resin having compatibility with the thermoplastic resin of said resin mold and said attachment and said thermoplastic resin being as a vehicle of said coating materials applied on the surface of said resin mold and said attachment.

Said thermoplastic resin having compatibility with the thermoplastic resins of said resin mold etc. is a thermoplastic resin wherein said thermoplastic resin is melted by heating and mixed with the thermoplastic resins of said resin mold etc. without phase separation.

Further, the thermoplastic resin used in said welding rod is the same thermoplastic resin as used as the material of said resin mold and said attachment. Said welding rod is manufactured by extruding said thermoplastic resin into a slender shape such as a column shape, a prism shape from the extruder or the like.

To bond said attachment to said resin mold, said welding rod is melted by heating with a fan heater or the like and said melted welding rod is attached to the welding surface of said resin mold and said attachment to weld together. Said melted welding rod attached to the welding surface of said resin mold or said attachment may be pressed by a spatula or the like to extend and improve welding strength (adhesive strength).

Preferably, said resin mold and said attachment are both heated beforehand to improve welding strength (adhesive strength).

[Recycle Method]

As the method for recycling said resin mold, a method wherein said resin mold discarded is crushed without separating the coating film from said resin mold and said crushed resin mold is heated and melted to mold a recycled resin mold, is provided. Said crushed resin mold may be heated and melted to form pellets and said pellets may be heated and melted to form a recycled resin mold. Moreover, in said heating and melting process, a rubber-like material having compatibility with the thermoplastic resin composing the mold may be added to the crushed resin mold to be recycled as a recycle aid agent.

[Recycle Aid Agent]

A rubber like material is used as a recycle aid agent and said rubber like material is a graft rubber having diene rubber, olefinic rubber or acrylic rubber as trunk and having graft chain being compatible with any of thermoplastic resins of said resin mold, said attachment, said adhesive, said welding rod, and said coating material. Namely, said rubber like material used as a recycle aid agent in the present invention includes grafted diene rubber, grafted olefinic rubber, and grafted acrylic rubber and grafted olefinic rubber and acrylic olefinic rubber are preferable as rubber like materials used as recycle aid agents since these grafted rubbers have a good thermal stability.

Hereafter each rubber like material is described.

A: Grafted Olefinic Rubber

Olefinic rubber used in said recycle aid agent of the present invention is a polymer of a α-olefin or a copolymer of two or more kinds of α-olefins, or a copolymer of one or more kinds of α-olefin(s) and one or more kinds of monomer (s) which can be copolymerized with α-olefin, and generally copolymer of ethylene and one or more kinds of other α-olefin(s) or copolymer of ethylene, and one or more kinds of other α-olefin(s) and one or more kinds of other monomers, especially nonconjugated diene compound is used as said olefinic rubber. In said copolymer of ethylene-α-olefin, said α-olefin is such as α-olefin having 3 to 12 carbons such as propylene, butene-1,4-methyl pentene-1, hexane-1, octene-1 and the like.

Said nonconjugated diene compound is such as dicyclopentadiene, tricyclopentadiene, 5-methyl-2,5-norbornadiene, 5-methylene-2-norbornene, 5-vinyl-2-norbornene, 5-ethylidene-2-norbornene, 5-isopropylidene-2-norbornene, 5-isopropenyl-2-norbornene, 5-(1-butenyl)-2-norbornene, 5-(2-propenyl)-2-norbornene, 5-(5-hexenyl)-2-norbornene, 4,7,8,9-tetrahydro-indene, isopropylidenetetrahydro-indene, cyclooctadiene, vinylcyclohexene, 1,5,9-cyclododecatoluene, 6-methyl-4,7,8,9-tetrahydroindene, 2,2'-dicyclopentenyl, trans-1,2-divinylcyclobutane, 1,4-hexadiene, 1,8-nonadiene, 1,9-decadiene, 3,6-dimethyl-1,7-octadiene, 4,5-dinethyl-1,7-octadiene, 1,4,7-octatriene, 5-methyl-1,8-nonadiene and the like.

Preferable nonconjugated diene compound is such as 5-ethylilidine-2-norbornene (ENB) and/or dicyclopentadiene (DCP), more preferably dicyclopentadiene. Mixture of AS or PS and grafted olefinic rubber using 5-ethylidene-2-norbornene gives a good appearance of said resin mold. Further in said grafted olefinic rubber, EPDM gives said thermoplastic resin of said resin mold a greater impact strength than EPM.

In said grafted olefinic rubber, molar ratio of ethylene/α-olefin/nonconjugated diene compound is desirably 0.2 to 1.0/0.2 to 0.8/0 to 0.2, more desirably 0.5 to 0.9/0.25 to 0.75/0 to 0.1, and molar ratio of ethylene/propylene is more than 60/40, desirably more than 65/35, and for recovery of mechanical property such as impact strength and the like in the recycled resin mold, ethylene rich ethylene-propylene copolymer rubber (EPM) or ethylene rich ethylene-propylene-nonconjugated compound terpolymer rubber is preferably used. Further Mooney viscosity of said ethylene-α-olefin copolymer used in the present invention is desirably in the range of 5 to 150, more desirably 10 to 120 and the optimum range is between 20 and 80 for recycle ability.

Typical olefinic rubber is ethylene-propylene copolymer rubber (EPM), ethylene-propylene-nonconjugated compound terpolymer rubber (EPDM)ethylene butane copolymer rubber (EBM) and ethylene-butene-nonconjugated compound terpolymer rubber (EBDM). The same kind of nonconjugated compound as used in EPDM is used in EBDM. Styrenic monomer and nitrile monomer is (are) graft-copolymerized to said olefinic rubber to give said olefinic rubber compatibility with the thermoplastic resin in which said grafted olefinic rubber is mixed. Said styrenic monomer graft-copolymerized to said thermoplastic resin is such as one or more kinds of styrene monomers comprising of styrene, α-alkylmonovinylidene aromatic monomer (e.g. α-methylstyrene, α-ethylstyrene, α-methylvinyltoluene, α-methyldialkylstyrene and the like), cyclo-substituted alkylstyrene (e.g. o, m, or p-vinyltoluene, o-ethylstyrene, p-ethylstyrene, 2,4-dimethylstyrene, p-tert butylstyrene and the like), cyclo-substituted halo styrene (e.g. o-chlorostyrene, p-chlorostyrene, 2,4-dichlorostyrene and the like), cyclo-alkyl, cyclo halo substituted styrene (e.g. 2-chloro-4-methylstyrene, 2,6-dichlorostyrene and the like), vinyl naphthalene, vinyl anthracene and the like.

Further, generally alkyl substitution group has 1 to 4 carbons and includes both normal chain and branched chain alkyl group.

Nitrile monomer graft-copolymeraized to said olefinic rubber is such as acrylonitrile, methacrylonitrile, ethacrylonitrile, fumaronitrile, and mixture thereof.

Other monomer besides said styrenic monomer and nitrile monomer may be copolymerized. Any kind of monomer(s) (third component) which can be copolymerized with said styrenic monomer and/or nitrile monomer can be used, and generally said monomer is such as (meth)acrylates such as methyl(meth)acrylate, ethyl(meth)acrylate and the like, maleimides such as N-phenylmaleimide, maleimide, N-methylmaleimide, N-ethylmaleimide, (p-bromophenyl) maleimidemethacrylate, cyclohexylmaleimide and the like, unsaturated nitrile compounds such as maleic anhydride methacrylonitrile and the like.

In said acrylate, acrylate whose alkyl group has 1 to 4 carbons are preferable and especially methacrylate is more preferable.

General polymerization method to graft copolymerize said monomer(s) to said olefinic rubber is that said monomer (s) is (are) (co)polymerized by using oil soluble initiator or water soluble initiator and/or high energy ray (beam) such as ultraviolet ray, electron beam and the like under existence of said olefinic rubber, and general polymerization such as bulk polymerization, suspension polymerization, solution polymerization, emulsion polymerization and the like is applied.

Said grafted olefinic rubber produced by graft copolymerization contains graft copolymer in narrow sense wherein olefinic rubber is trunk and polymer chain of said monomer (s) is branch as main component and said olefinic rubber and/or (co) polymer of said monomer (s) are (is) microblended in said graft copolymer.

Hereafter grafted olefinic rubber suitable as a recycle aid agent for each thermoplastic resin in recycle system is described.

[Graft Polymer for Styrenic Resin]

For styrenic resin such as PS and HIPS, grafted olefinic polymer wherein one or more kinds of styrene monomer and/or one or more kinds of styrene analog monomer used in said styrenic resin is (are) graft polymerized to said olefinic rubber is used. Hereafter said grafted olefinic rubber is called styrene grafted olefinic graft polymer. Since said styrene grafted olefinic graft polymer has graft chains which is polymer chain of said styrenic monomer having almost the same solubility parameter, said styrene grafted olefinic graft polymer has a good compatibility with PS.

For styrenic resin such as AS and ABS, olefinic graft polymer wherein styrene and/or one or more kind(s) of other styrenic monomer(s) and acrylonitrile and/or one or more kind(s) of other cyano monomer are graft-polymerized, said olefinic graft polymer being graft-copolymer of styrene and/or one or more kind(s) of other styrenic monomer(s) and acrylonitrile and/or one or more kind(s) of other nitrile monomer(s) containing olefinic rubber, hereafter said graftcopolymer is called styrene-nitrile grafted olefinic graft polymer.

Besides said monomers, other monomer(s) which can be copolymerized with said monomer(s) may be graft copolymerized together. Said monomer(s) are listed in paragraph [Styrenic resin].

Since said styrene-nitrile grafted olefinic graft polymer has styrene-nitrile copolymer chains as branch having almost the same solubility parameters as AS or ABS, said graft polymer has a good compatibility with AS or ABS.

In said olefinic rubber graft polymer, said olefinic rubber may be singly used or mixture of two or more kinds of said olefinic rubber may be used.

In said olefinic rubber graft polymer, said olefinic rubber content is in the range of 10 to 80% by weight, preferably 15 to 75% by weight, total content of monomer(s) used for graft polymerization (graft ratio) is in the range of 90 to 20% by weight, preferably 55 and 25, and in the case of styrenenitrile grafted olefinic rubber graft polymer, styrenic monomer content is preferably in the range of 5 to 95% by weight and nitrile monomer content is preferably in the range of 95 to 5% by weight.

In said range, said olefinic rubber graft-polymer's compatibility with the thermoplastic resin, and improving effect of recycle ability, namely preventive effect of degradation of impact strength of the thermoplastic resin in recycling process are balanced.

Particle size of said olefinic rubber graft polymer is preferably in the range of molecular level to 5.09 $\mu$m, more preferably 0.001 to 2.0$\mu$. In this range of particle size, effect of improving recycle ability may become especially good.

In the case where two or more kinds of olefinic rubber particles having different particle sizes respectively are contained in said olefinic rubber graft polymer, mechanical properties of recycled thermoplastic resin are further improved so that additional quantity of said olefinic rubber graft polymer can be saved.

Further, reduced viscosity ($\eta$sp/c) of toluene soluble section of said olefinic rubber graft polymer which is a barometer of molecular weight is preferably in the range of 0.30 to 1.00 g/dl, more preferably 0.50 to 0.80 g/dl.

Said olefinic rubber graft polymer is such as

Concretely, said olefin type rubber graft polymer may be styrene graft EPM and/or EPDM (St-g-EPM, St-g-EPDM, St-g-EPM-EPDM) which are that styrene is graftpolymerized with EPM and/or EPDM in the case of using for PS or HIPS, acrylonitrile-styrene graft EPM and/or EPDM (AnSt-g-EPM, AnSt-g-EPDM, AnSt-g-EPM-EPDM) which are that acrylonitorile and styrene are graftpolymerized with EPM and/or EPDM in the case of using for AS or ABS, styrene graft EBM and/or EBDM (St-g-EBM, St-g-EBDM, St-g-EBM-EBDM) which are that styrene is graft-polymerized with ethylene-butene rubber (EBM) and/or ethylene-butene-diene terpolymer (EBDM) in the case of using for PS, acrylonitrile-styrene graft EBM and/or EBDM (AnSt-g-EBM, AnSt-g-EBDM, AnSt-g-EBM-EBDM) which are that Acrylonitrile and styrene are graft-polymerized with EBM and/or EBDM in the case of using for AS or ABS.

Concretely, said olefin type rubber graft polymer may be styrene graft EPM and/or EPDM (St-g-EPM, St-g-EPDM, St-g-EPM-EPDM) which are that styrene is graftpolymerized with EPM and/or EPDM in the case of using for PS or HIPS, acrylonitrile-styrene graft EPM and/or EPDM (AnSt-g-EPM, AnSt-g-EPDM, AnSt-g-EPM-EPDM) which are that acrylonitorile and styrene are graftpolymerized with EPM and/or EPDM in the case of using for AS or ABS, styrene graft EBM and/or EBDM (St-g-EBM, St-g-EBDM, St-g-EBM-EBDM) which are that styrene is graft-polymerized with ethylene-butene rubber (EBM) and/or ethylene-butene-diene terpolymer (EBDM) in the case of using for PS, acrylonitrile-styrene graft EBM and/or EBDM (AnSt-g-EBM, AnSt-g-EBDM, AnSt-g-EBM-EBDM) which are that Acrylonitrile and styrene are graft-polymerized with EBM and/or EBDM in the case of using for AS or ABS.

In the present invention, mixture of AS and AnSt-g-EPM is expressed as EPM-AS, mixture of AS and AnSt-g-EPDM is expressed as EPDM-AS, mixture of AS and AnSt-g-EPM and AnSt-g-EPDM is expressed as EPM-EPDM-AS, mixture of PS and St-g-EPM is expressed as EPM-PS, mixture of PS and St-g-EPDM is expressed as EPDM-PS, and mixture of PS and St-g-EPM and St-g-EPDM is expressed as EPM-EPDM-PS.

Further, mixture of graft rubber wherein nitrile monomer such as acrylonitrile and styrenic monomer are grafted to acrylic rubber (AnSt-g-Acrylic rubber) and AS is expressed as acryl-AS, and mixture of graft rubber wherein styrenic monomer is grafted to acrylic monomer (St-g-acrylic rubber) is expressed as acryl-PS.

[Graft Polymer for PPE Resin]

PPE resin consists of structural unit having phenyl group as mentioned above, so that said styrene grafted olefinic rubber graft polymer such as St-g-EPM, St-g-EPDM, St-g-EPM·EPDM, St-g-EBM, St-g-EBDM, and St-g-EBM·EBDM is preferably selected as said graft polymer.

Since said olefinic rubber graft polymer has styrene polymer chains as branches having almost the same solubility as PPE resin, said olefinic rubber graft polymer has a good compatibility with PPE resin so that said olefinic rubber graft polymer is mixed stably in PPE resin without phase separation to improve recycle ability of said PPE resin.

In the present invention, mixture of PPE and olefinic rubber graft polymer St-g-EPM is expressed as EPM-PPE, mixture of PPE and St-g-EPDM is expressed as EPDM- PPE, mixture of PPE and St-g-EPM and St-g-EPDM is expressed as EPM-EPDM-PPE, mixture of PS and EPM-PPE is expressed as EPM-PS-PPE, mixture of PS and EPDM-PPE is expressed as EPDM-PS-PPE, and mixture of PS and PPE and St-g-EPM and St-g-EPDM is expressed as EPM-EPDM-PS-PPE. Further, mixture of PPE and acrylic rubber graft polymer St-g-Acrylic rubber is expressed as acryl-PPE, and mixture of PS and acryl-PPE is expressed as acryl-PS-PPE.

[Graft Polymer for Olefinic Resin]

For olefinic resin such as polyethylene, polypropylene and the like, since said olefinic rubber is produced by (co)polymerization using the same or similar monomer(s) as (to) said olefinic resin and has almost the same solubility parameter as especially PP, said olefinic rubber has a good compatibility with said olefinic resin so that said olefinic rubber is used as recycle aid agent for said olefinic resin as it is.

Ethylene-α-olefin molar ratio, and if necessary, non-conjugated diene compound molar ratio in said recycle agent for said olefinic resin is desirably ethylene/α-olefin/nonconjugated diene compound=0.2 to 1.0/0.2 to 0.8/0 to 0.2, more desirably 0.5 to 0.9/0.25 to 0.75/0 to 0.1 and molar ratio of ethylene/propylene is more than 60/40, desirably more than 65/35 and for recycleability of mechanical properties such as impact strength of the recycled resin mold, ethylene, propylene copolymer rubber (EPM) containing ethylene in a rich quantity or ethylene-propylene-non-conjugated diene compound therpolymer polymer/rubber (EPDM) containing ethylene in a rich quantity is desirably used.

Further, Mooney viscosity ($ML_{1+4}$, 100° C.) of ethylene-α-olefinic copolymer used in the present invention is preferably 5 to 150, more preferably 10 to 120, and 20 to 80 in optimum for recycle ability.

Still further, olefinic rubber graft polymer such as St-g-EPM, St-g-EPDM, AnSt-g-EPM, AnSt-g-EPDM and the like, also have a good compatibility with said polyolefinic resin and are used to improve the mechanical properties of said polyolefinic resin as a recycle acid agent.

B: Acrylic Rubber Graft Polymer

Acrylic rubber used in the present invention is a copolymer of acrylic ester(s) such as acrylate homopolymer having alkyl group having 2 to 8 carbon atoms preferably, such as ethylacrylate, n-butylacrylate, 2-ethylhexylacrylate and the like, copolymer comprising two kinds and over of acrylate monomers mentioned above, copolymer comprising one or more kinds of acrylate monomer(s) mentioned above and butadiene or one or more kinds of other monomer(s) such as non-conjugated diene compounds which can be used for EPDM similarly, acrylonitrile, methylmethacrylate, vinyl acetate, styrene, ethylene, propylene and the like, copolymer comprising one or more kinds of acrylate monomer(s) and functional monomer(s) such as acrylic acid methacrylic acid, β-hydroxyethylmethacrylate, acrylamide, dimethylaminoethylmethacrylate and the like or polymerization silane coupling agent(s) such as γ-methacryloxypropyltrimethoxysilane, vinyltriacetoxysilane, p-trimethoxysilylstyrene, p-triethoxysilylstyrene, p-trimethoxysilyl-α-methylstyrene, p-triethoxysilyl-α-methylstyrene, γ-acryloxypropyltrimethoxysilane, vinyltrimethoxysilane, N-β(N-vinylbenzylaminoethyl-γ-aminopropyl) trimethoxysilane hydrochloride and the like.

General acrylic rubber is such as copolymers copolymerized with above mentioned functional monomer, such as polyethyl acrylate, poly n-butyl acrylate, n-butyl acrylate-acrylonitrile copolymer, n-butylacrylate-butadiene copolymer, n-butyl acrylate-ethylene copolymer, n-butyl acrylate-γ-methacryloxypropyltrimethoxysilane copolymer, n-butylacrylate-vinyltrimethoxysilane copolymer and the like may be used in this invention. n-Butyl acrylate-butadiene copolymer having a mole ratio of n-butylacrylate/butadiene 30/70 and over is preferable to acrylic rubber.

Said acrylic rubber is produced generally by suspension polymerization, emulsion polymerization, and the like.

Styrenic monomer and nitrile monomer are graft polymerized to said acrylic rubber in the same way as olefinic rubber mentioned above, to give acrylic rubber compatibility with styrenic resin, PPE resin, and PC resin.

Considering the balance of the compatibility and preventive effect of degradation of impact strength in recycling, acrylic rubber content is 10 to 80% by weight, desirably 15 to 75% by weight, total content of monomer(s) used for graft polymerization (graft ratio) is 90 to 20% by weight desirably 55 to 25% by weight, and in the case of styrene-nitrile grafted acrylic rubber graft polymer, styrene content is desirably 5 to 95% by weight and nitrile content is desirably 95 to 5% by weight.

In the above mentioned range, the compatibility of said acrylic rubber graft polymer with the thermoplastic resin and improving effect of recycle ability of said thermoplastic resin, namely preventive effect of degradation of impact strength in recycling are balanced.

Hereafter heat resistance test of said coating material (paint) is described. However said coating materials used in the present invention is not limited to coating materials having compositions described below.

[Heat Resistance Test]

To 100 parts by weight of copolymer of styrene-methyl methacrylate-ethyl acrylate-acrylic acid (20:40:39:1 weight ratio), 10 parts by weight of cellulose acetate butyrate was added and mixed to prepare Paint A. Further, nitrocellulose (nitrification degree (N %) 11.5%) was added and mixed instead of cellulose acetate butyrate in said Paint A to prepare Paint B. Still further, copolymer of vinyl acetate-vinyl chloride containing 25% by weight of vinyl acetate was added and mixed instead of cellulose acetate butyrate to prepare Paint C.

TABLE 1

| Mass Percentage | Paint A | Paint B | Paint C |
| --- | --- | --- | --- |
| Styrene Acrylate Resin Varnish | 36 | 36 | 36 |
| 1/2 Cellulose Acrylate Butyrate (20%) | 25 | — | — |
| 1/4 Nitrocellulose Varnish (25%) | — | 20 | — |
| Vinyl Acetate Vinyl Chloride Copolymerization Resin Varnish | — | — | 25 |
| Almi Paste | 10 | 10 | 10 |
| Ethyl acetate | 15 | 15 | 15 |
| Butanol | 10 | 10 | 10 |
| MIBK | 4 | 4 | 4 |
| Leveling Agent | 0.3 | 0.3 | 0.3 |
| Antifoamer | 0.1 | 0.1 | 0.1 |
| Thinner | 100 | 100 | 100 |

Said Paint A, B, and C were respectively coated on ABS pellets and HIPS pellets in the amount to be 2.5% by weight of dry coating film content. Each pellet on which Paint A or B or C was respectively coated was injection-moled at a melting resin temperature 240° C. in the case of ABS pellets and at a resin melting temperature 225° C. in the case of HIPS pellets to prepare test pieces.

The results of comparison of color difference between each test piece and pellets of unused resin material are shown in Table 2. Color difference was measured by a color difference meter (CR-300 (measuring head), DP-300 (data processor), MINOLTA Co. Ltd.).

TABLE 2

| Material | Test Piece | $\Delta$L | $\Delta$a | $\Delta$b | $\Delta$E |
|---|---|---|---|---|---|
| ABS | Unused Material | 0 set | 0 set | 0 set | 0 set |
|  | Paint A | +0.37 | +0.05 | −0.57 | 0.68 |
|  | Paint B | −8.56 | +0.87 | +25.23 | 26.65[ |
|  | Paint C | −5.67 | +0.22 | +16.00 | 16.97 |
| HIPS | Unused Material | 0 set | 0 set | 0 set | 0 set |
|  | Paint A | −0.15 | −0.22 | +0.61 | 0.62 |
|  | Paint B | −7.06 | +0.67 | +20.60 | 21.78 |
|  | Paint C | −9.41 | −0.42 | +12.46 | 15.16 |

Note:
The color of the unused material was set as ZERO.

Example of the present invention are described hereinafter, however the scope of the present is not limited to only Examples.

EXAMPLE 1

FIG. 1 relates to Example 1. Referring to FIG. 1 showing a cabinet (1), legs (3) and a label (4) are attached to a cabinet body (2) wherein said legs (3) were welded to said body (2) and said label (4) was bonded to said body by an adhesive. Material of said cabinet body (2), legs (3), and label (4) are respectively ABS resin, and said adhesive and a paint coated on said cabinet body (2) and an ink printed on said label (4) have following compositions.

Adhesive

40% by weight of methyl-ethyl ketone:xylol (50:50 weight ratio) solution of copolymer of styrene:methyl-methacrylate:ethylacrylate:acrylic acid (20:40:39:1 weight ratio).

Paint

To 100 parts by weight of said copolymer solution used in said adhesive, 10 parts by weight of cellulose acetate butyrate and 40 parts by weight of pugment were added and mixed together to prepare paint.

Ink

To 100 parts by weight of said copolymer used in said paint, 40 parts by weight of said dyestuff was added to prepare ink. Letters [REPELLE] (re-pellet) is printed on said label (4) by using said ink, and letters [REPELLE] carry an information that this resin mold can be recycled by crushing and melting as it is without separating or segregating.

Said cabinet (1) consisting of said cabinet body (2), said legs (3) and said label (4) was crushed and pelletized and Test Sample A consisting of only said pellets and Test Sample B consisting of 95 parts by weight of said pellets and 5 parts by weight of a recyclce agent (AnSt-g-EPDM) were prepared for measurement of Izod impact strength (ASTM-D256).

Further, Test Sample C consisting of unused resin (ABS resin) was also prepared for measurement of Izod impact strength as a comparison.

The test results are shown in Table 3. Further, said recycle aid agent (AnSt-g-EPDM) is a grafted rubber-like polymer wherein acrylonitrile and styrene are graft copolymerized to EPDM containing DCP as a third component (E/P/DCP= 65/25/10 in molar ratio) and Mooney viscosity ($ML_{1+4}$ 100° C.) of said EPDM is 80, average size of rubber particles is 1 μm, An/EPDM/st=23/29/48 (graft ratio 71% by weight).

TABLE 3

| Evaluation Item | Sample A | Sample B | Sample C |
|---|---|---|---|
| Izod Impact Strength | 16.8 | 22.1 | 16.6 |

It was confirmed in Table 3 that Izod impact strength (Kg-cm/cm) of said Test Samples A and B were nearly equal to that of Test Sample C (in the case where said thermoplastic resin compound was molded and the resulting resin mold was crushed and pelletized) and Test Samples A and B showed no yellowing caused by said coating material.

EXAMPLE 2

The same cabinet (1) consisting of a cabinet body (2), legs (3) and label (4) as said cabinet of EXAMPLE-1 was manufactured by using HIPS, and further, Test Samples A', B' and C' were prepared in the same way as EXAMPLE 1 and Izod impact strength (ASTM-D 256) was measured for each sample. Test results are shown in Table 4. Said recycle aid agent (St-g-EPDM) is a grafted rubber like polymer wherein styrene is graft polymerized to EPDM containing DCP as third component (E/P/DCP=65/25/10 in molar ratio) and Mooney viscosity ($ML_{1+4}$ 100° C.) is 80 and average rubber particle size is 1 μm and EPDM/st is 45/55.

TABLE 4

| Evaluation Item | Sample A | Sample B | Sample C |
|---|---|---|---|
| Izod Impact Strength | 6.8 | 8.3 | 6.6 |

It was confirmed in Table 4 that Izod impact strength (Kg-cm/cm) of said Test Samples A' and B' were nearly equal to that of Test Sample C' (in the care where said thermoplastic resin compound was molded and the resulting resin mold was crushed and pelletized) and Test Samples A' and B' showed non-yellowing caused by said coating material.

EXAMPLE 3

Using ABS resin (Styrac 191 (trade name) Asahi Chemical Industry Co., LTD.) and PS resin (A & M Polystyrene HF 77 (trade name) A & M Co., Ltd.), molds having a shape shown in FIG. 2 were molded at a melting temperature 235° C. in the case of ABS and a melting temperature 210° C. in the case of PS. One side of each resin mold made of ABS of PS (A side having flat face without rib in FIG. 2) was coated with eight kinds of solution type paints as shown in Table 6, by air-spraying, said paints made of mixtures of styrene modified acrylic resin (Acrydick A-157 (trade name) Dainippon Ink and Chemicals Inc.) and each cellulose derivative being 80/20 and solvent mixture of ethyl acetate and MIBK and the like being used.

TABLE 5

| Cellulose derivative | Viscosity (sec) | Acetyl group content (%) | Butyryl group content (%) | Propionyl group content (%) | Hydoxyl group content (%) | Melting range (° C.) | Tg (° C.) |
|---|---|---|---|---|---|---|---|
| CAB-1 | 0.01 | 2.0 | 53.0 | | 1.5 | 127–142 | 85 |
| CAB-2 | 1.9 | 3.0 | 50.0 | | 1.7 | 135–150 | 115 |
| CAB-3 | 0.5 | 13.5 | 38.0 | | 1.3 | 155–165 | 130 |
| CAB-4 | 0.1 | 17.5 | 32.5 | | 1.3 | 165–175 | 127 |
| CAP-1 | 0.2 | 0.6 | | 42.5 | 5.0 | 188–210 | 159 |
| CAP-2 | 0.4 | 2.5 | | 45.0 | 2.6 | 188–210 | 142 |
| Cellulose nitrate-1 | 1/4 | | | | | | |
| Cellulose nitrate-2 | 20 | | | | | | |

TABLE 6

| Raw materials (wt %) | Paint A | Paint ① | Paint ② | Paint ③ | Paint ④ | Paint ⑤ | Paint ⑥ | Paint ⑦ | Paint ⑧ |
|---|---|---|---|---|---|---|---|---|---|
| Styrene modified acrylic resin 50 wt % varnish*1 | 50 | 45 | 45 | 45 | 45 | 45 | 45 | 45 | 45 |
| Cellulose derivatives CAB-1*2 | 0 | 20 | 0 | 0 | 0 | 0 | 0 | 0 | 0 |
| CAB-2*3 | 0 | 0 | 20 | 0 | 0 | 0 | 0 | 0 | 0 |
| CAB-3*4 | 0 | 0 | 0 | 20 | 0 | 0 | 0 | 0 | 0 |
| CAB-4*5 | 0 | 0 | 0 | 0 | 20 | 0 | 0 | 0 | 0 |
| CAP-1*6 | 0 | 0 | 0 | 0 | 0 | 20 | 0 | 0 | 0 |
| CAP-2*7 | 0 | 0 | 0 | 0 | 0 | 0 | 20 | 0 | 0 |
| Cellulose nitrate-1*8 | 0 | 0 | 0 | 0 | 0 | 0 | 0 | 20 | 20 |
| Cellulose nitrate-2*9 | 0 | 0 | 0 | 0 | 0 | 0 | 0 | 0 | 0 |
| Adipate ester*10 | 5 | 5 | 5 | 5 | 5 | 5 | 5 | 5 | 5 |
| Almi paste*11 | 10 | 10 | 10 | 10 | 10 | 10 | 10 | 10 | 10 |
| Ethyl acetate | 10 | 10 | 10 | 10 | 10 | 10 | 10 | 10 | 10 |
| Butanol | 5 | 5 | 5 | 5 | 5 | 5 | 5 | 5 | 5 |
| MIBK | 5 | 5 | 5 | 5 | 5 | 5 | 5 | 5 | 5 |
| Leveling agent*12 | 0.3 | 0.3 | 0.3 | 0.3 | 0.3 | 0.3 | 0.3 | 0.3 | 0.3 |
| The sum total | 80.3 | 100.3 | 100.3 | 100.3 | 100.3 | 100.3 | 100.3 | 100.3 | 100.3 |

*1Styrene modified acrylic resin whose name is ACRYDIC A-157 was manufactured by DAINIPPON INK AND CHEMICALS. INCORPORATED.
*2 to 7Cellulose derivatives, manufactured by EASTMAN CHEMICAL COMPANY, were dissolved into ethyl acetate/MIBK = 1/1 solvent.
*8 and 9Cellulose nitrate was manufactured by Asahi Kasei corpration.
*10Adipate ester whose name is HORISYZER-W-1820 was manufactured by DAINIPPON INK AND CHEMICALS. INCORPORATE|
*11Almi paste whose name is SL440EB was manufactured by SHOWA ALMINIUM K.K..
*12Leveling agent whose name is BYK-310 was manufactured by BYK CHEMICAL Inc.

As a result, each paint ① to ⑧ has a good adhesiveness to each resin mold as shown in Table 7.

TABLE 7

| Resin | Paint ① | Paint ② | Paint ③ | Paint ④ | Paint ⑤ | Paint ⑥ | Paint ⑦ | Paint ⑧ |
|---|---|---|---|---|---|---|---|---|
| PS | ○ | ○ | ○ | ○ | ○ | ○ | ○ | ○ |
| ABS | ○ | ○ | ○ | ○ | ○ | ○ | ○ | ○ |

Note
○: Good adhesion

Further, each resin mold was crushed and pelletized with coating film as it used and re-molded at the same temperature condition as unused thermoplastic resin (in the case of PS at 210° C., in the case of ABS, 235° C.) and the resulting molds were estimated in moldability and appearances of resin mold. As a result, in the case where CAB was used as cellulose derivative in said paint, satisfactory re-moldability and a good heat resistance were guaranteed not depending on its viscosity, its acetyl group content, and butyryl content so that CAB is one of the most suitable cellulose derivative as additive for paint having recycle ability. Further, in the case where CAP (cellulose acetate propionate) was mixed in paint releasing property of the resulting resin mold failed a little in molding but CAP had the same good heat resistance and recycling ability as CAB.

TABLE 8

| Resin | Items | Paint ① | Paint ② | Paint ③ | Paint ④ | Paint ⑤ | Paint ⑥ | Paint ⑦ | Paint ⑧ |
|---|---|---|---|---|---|---|---|---|---|
| PS | Yellowing color | ○ | ○ | ○ | ○ | ○ | ○ | X | X |
|  | Silver | ○ | ○ | ○ | ○ | ○ | ○ | X | ○ |
| ABS | Yellowing color | ○ | ○ | ○ | ○ | ○ | ○ | X | X |
|  | Silver | ○ | ○ | ○ | ○ | ○ | ○ | X | ○ |

TABLE 8-continued

| Resin | Items | Paint ① | Paint ② | Paint ③ | Paint ④ | Paint ⑤ | Paint ⑥ | Paint ⑦ | Paint ⑧ |
|---|---|---|---|---|---|---|---|---|---|
| | Recycle evaluation | ○ | ○ | ○ | ○ | ○ | ○ | X | X |

Notes
○: Good recyclable resin
X: Not good recyclable resin

In the case of nitrocellulose, lower viscosity grade shows a larger discoloration and has worse heat resistance. Especially nitrocellulose having a low viscosity (¼ sec) was decomposed by heating, then it cause yellowing of the resin and further generated decomposing gas causing silvering of the resulting resin mold which causes appearance defect. In the case of nitrocellulose having a viscosity (20 sec), said nitrocellulose was decomposed by heating causing yellowing of the resin, but the yellowing was slighter than that of nitrocellulose having a viscosity (¼ sec) and silvering of the resulting resin mold caused by generating decomposing gas was not observed. Cellulose acetate has low recycle ability and is not suitable for additive of paint. Table 9 shows Izod impact strength of PS and ABS of recycled resin molds in the case where coated resin molds were crushed and pelletized to mix with paints ① to ⑧ each other. For comparison, Izod impact strength of the resin of the uncoated resin molds and the resin molds coated with Paint A containing only styrene modified acrylic resin were measured.

As shown in Table 9, in the case where cellulose derivative is mixed with said thermoplastic resin of said resin mold, mechanical properties of the resin are not so degraded.

TABLE 9

| Resin | No paint | Paint A | Paint ① | Paint ② | Paint ③ | Paint ④ | Paint ⑤ | Paint ⑥ | Paint ⑦ | Paint ⑧ |
|---|---|---|---|---|---|---|---|---|---|---|
| PS | 8.6 | 8.4 | 8.4 | 8.5 | 8.3 | 8.4 | 8.5 | 8.5 | 8.3 | 8.2 |
| ABS | 19.6 | 19.5 | 19.3 | 19.6 | 19.6 | 19.5 | 19.3 | 19.2 | 18.9 | 19.1 |

Unit: kg/cm$^2$

Notes
PS: Unnotched
ABS: Notched

EFFECT OF THE INVENTION

Said thermoplastic resin mold of the present invention is coated with said coating material containing the thermoplastic resin as its vehicle having compatibility with that of said resin mold, so that said resin mold, discarded, can be recycled without removing the coating film. Further, since said coating material contains non-yellowing type cellulose derivative, the color of the recycled resin mold does not degrade.

BRIEF DESCRIPTION OF THE DRAWINGS

FIG. 1—Perspective view of a cabinet

AN EXPLANATION OF CODES

Figure 1:
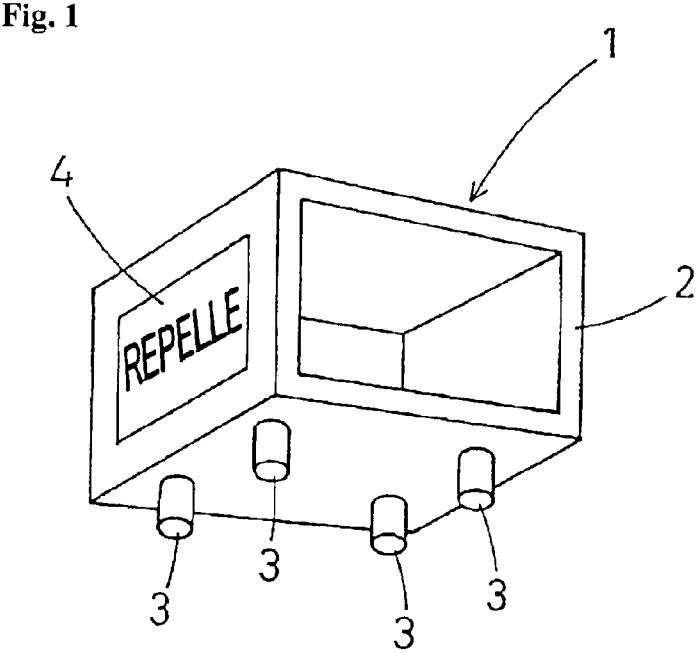
FIG. 1 shows an embodiment of the present invention.
Figure 2:
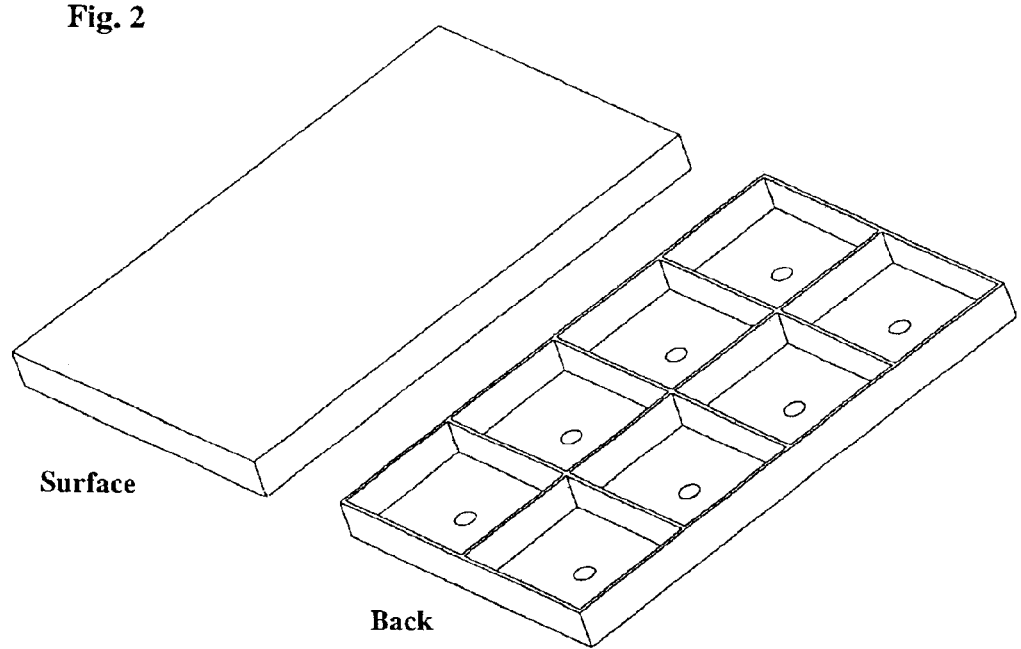
FIG. 2—Perspective view of a resin mold

1. Cabinet
2. Cabinet body
3. Legs
4. Label

What is claimed is:

1. A coating material for recycling containing a thermoplastic resin having compatibility with a thermoplastic resin of a thermoplastic resin mold on which said coating material is applied, and a non-yellowing cellulose derivative as vehicles wherein said thermoplastic resin mold on which said coating material is applied can be recycled without removing coating film of said coating material.

2. A coating material of claim 1, wherein said non-yellowing type cellulose derivative is selected from methyl cellulose, ethyl cellulose, hydroxy cellulose, hydroxypropyl methyl cellulose, hydroxyethyl methyl cellulose, cellulose acetate, acetyl cellulose, benzyl cellulose, cellulose, cellulose acetate butyrate, and cellulose acetate propionate.

3. A coating material of claim 2, wherein the viscosity of said cellulose acetate butyrate is in the range of 0.1 sec. to 0.55 sec.

4. A coating material of claim 2, wherein acetyl group content of said cellulose acetate butyrate is in the range of 0 to 15.0% by weight.

5. A coating material of claim 2, wherein butyryl group content of said cellulose acetate butyrate is in the range of 30.0 to 55.0% by weight.

6. A coating material of claim 2, wherein propionyl group content of said cellulose acetate propionate is in the range of 40 to 50% by weight and hydroxyl group content is in the range of 1 to 5% by weight.

7. A coating material of claim 2, wherein said cellulose acetate is cellulose diacetate and acetylation degree is in the range of 50 to 60% by weight.

8. A coating material of claim 2, wherein ethoxy group content of said ethyl cellulose is in the range of 45 to 50% by weight.

9. A coating material of claim 2, wherein methoxy group content of said methyl cellulose is in the range of 19 to 31.5% by weight.

10. A coating material of claim 2, wherein hydroxy propyl group content of said hydroxy propyl methyl cellulose is in the range of 4 to 12% by weight.

11. A coating material of claim 2, wherein hydroxy ethoxy group content of said hydroxy ethyl methyl cellulose is in the range of 4 to 12% by weight.

12. A coating material of claim 1, wherein said coating material is ink or paint.

13. A thermoplastic resin mold on the surface of which said coating material of claim 1 is applied.

14. A thermoplastic resin mold of claim 13, wherein attachment(s) made of a thermoplastic resin having compatibility with a thermoplastic resin composing said thermoplastic resin mold is (are) attached to said thermoplastic resin mold by an adhesive or welding rod, said adhesive or welding rod being made of a thermoplastic resin having compatibility with said thermoplastic resin composing said thermoplastic resin mold.

15. A thermoplastic resin mold of comprising the coating material of claim 2.

16. A thermoplastic resin mold of claim 13, wherein a rubber like material having compatibility with a thermoplastic resin composing said thermoplastic resin mold is added to said thermoplastic resin composing said thermoplastic resin mold as a recycle aid agent.

17. A thermoplastic resin mold of claim 14, wherein a rubber like material having compatibility with each thermoplastic resin composing both said thermoplastic resin mold and said attachment is added to each thermoplastic resin as a recycle aid agent.

* * * * *